United States Patent Office 3,275,596
Patented Sept. 27, 1966

3,275,596
FIRE RESISTANT POLYOLEFINS CONTAINING AN ARSENIC, ANTIMONY, OR BISMUTH COMPOUND AND A HALOGENATED DIAROMATIC ESTER OF A DICARBOXYLIC ACID
Helmut Klug and Karl Kuchinka, Augsburg, Heinrich Peters, Wiesbaden, Dietrich Schleede, Frankfurt am Main, and Jakob Winter, Hofheim, Germany, assignors to Hercules Incorporated, a corporation of Delaware
No Drawing. Filed June 7, 1963, Ser. No. 286,161
Claims priority, application Germany, June 9, 1962, F 37,031; June 13, 1962, F 37,048
8 Claims. (Cl. 260—45.75)

The present invention relates to the flameproofing of normally flammable organic thermoplastic polymers.

For many purposes, it is desirable to render normally flammable organic thermoplastic polymers flameproof, and numerous proposals have been advanced for accomplishing this objective. Most of these proposals involve the incorporation of certain additives into the polymer. For example, German Auslegeschrift 1,026,951 describes the flameproofing of translucent or transparent polymers by incorporation therein of chlorinated paraffin and a carboxylic acid salt of antimony, arsenic, or bismuth. It has been found, however, that the incorporation of these additives adversely affects the mechanical properties of the polymers to a substantial degree.

It is also known to flameproof polyefins by the addition of antimony trioxide and a halogenated compound such as octachlorodiphenylene dioxide, 2,4,6-tribromoaniline, or tribromophenyl ether. The compositions resulting from the incorporation of such additives show the disadvantage, however, of efflorescing when stored at room temperature.

It has now been found, in accordance with this invention, that polyolefins such as polyethylene and polypropylene can be rendered flameproof by the addition of minor amounts of (1) an oxygen or sulfur compound of antimony, arsenic, or bismuth and (2) an aromatic ester of a dicarboxylic acid of the general formula

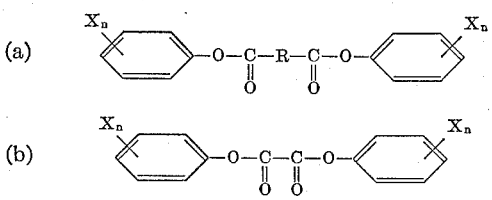

wherein R in Formula $a$ is a hydrocarbon radical, chlorohydrocarbon radical, or oxyhydrocarbon radical containing from 1–10 carbon atoms, X in both Formulae $a$ and $b$ represents bromine or chlorine, and $n$ in both Formulae $a$ and $b$ is an integer from 2 to 5. Surprisingly adequate self-extinguishing properties are obtained with relatively small amounts of these additives, the additives do not effloresce upon storage of the compositions, and they affect the mechanical properties of the polymer to a relatively minor extent.

Exemplary of oxygen and sulfur compounds of arsenic, antimony, and bismuth that can be used in the practice of the invention are antimony trioxide, antimony pentoxide, antimony trisulfide, antimony pentasulfide, arsenic trioxide, arsenic pentoxide, arsenic trisulfide, and bismuth trioxide. These additives can be employed individually or in combination with each other.

The second additive according to the invention is a halogenated aromatic ester of a dicarboxylic acid. Exemplary of compounds of this class that are useful in the invention are oxalic acid-bis(pentachlorophenyl) ester,
oxalic acid-bis(trichlorophenyl) ester,
tetrachlorosuccinic acid-bis(pentachlorophenyl) ester,
succinic acid-bis(pentachlorophenyl) ester,
adipic acid-bis(pentachlorophenyl) ester,
sebacic acid-bis(2,4-dichlorophenyl) ester,
fumaric acid-bis(pentachlorophenyl) ester,
tartaric acid-bis(trichlorophenyl) ester,
oxalic acid-bis(pentabromophenyl) ester,
oxalic acid-bis(tribromophenyl) ester,
tetrachlorosuccinic acid-bis(tribromophenyl) ester,
succinic acid-bis(pentabromophenyl) ester,
adipic acid-bis(pentabromophenyl) ester,
adipic acid-bis(tribromophenyl) ester,
sebacic acid-bis(tribromodichlorophenyl) ester,
sebacic acid-bis(2,4-dibromophenyl) ester, and
tartaric acid-bis(tribromophenyl) ester.

The polyolefins which can be made self-extinguishing according to the invention are polymers of olefins having the general formula $CH_2=CHR$, wherein R represents hydrogen or an aryl radical or an alkyl radical having up to 10 carbon atoms. Typical polymers are those of ethylene, propylene, butene-1, isobutylene, pentene-1, 4-methylpentene-1, styrene, and dimethylstyrene.

The amounts of the two previously described additives to be incorporated in the polymer can be varied considerably. Generally speaking, it is possible to use from 2 to 30 parts, preferably not more than 15 parts, of the oxygen or sulfur compound of antimony, arsenic, or bismuth per 100 parts by weight of the polymer and from 3 to 30 parts of the aromatic ester of a dicarboxylic acid per 100 parts by weight of polymer.

The compositions of the invention may also contain other additives. The addition of small amounts, say up to about 5 parts, of a compound capable of increasing the thermostability of the halogenated aromatic esters of dicarboxylic acids, such as glycerine, pentaerythritol, or 4,4'-isopropylidene bisphenol, is often beneficial. Small amounts of poly(vinyl chloride) stabilizers, such as the organic acid salts of barium, cadmium, tin, and lead, can also be incorporated in the compositions.

The additives of the invention can be blended with the polymer individually or simultaneously by known procedures, such as by extrusion or similar techniques.

The following examples are presented for the purpose of illustrating the invention. The compositions of the examples were prepared by blending the polymer and additives in a 10-liter Henschel laboratory fluid mixer, Model FM 10/L, and then extruding the mixture twice on a Weber extruder, Model ET 24, and then granulating the extrudate. The granules of each composition were then injection molded into rods having the dimensions 100 x 20 x 1 mm. The flammability of the injection-molded rods was tested by holding each rod in the bright flame of a Bunsen burner about 10 mm. above the non-luminous inner flame of the burner. After 10 seconds, the flame was removed and the time which passed until the burning sample extinguished itself was measured.

Example 1

One hundred parts by weight of low density polyethylene, 12 parts by weight of oxalic acid-bis(pentchlorophenyl) ester, and 8 parts by weight of arsenic trioxide were mixed and blended as previously described. A total of 10 rods were molded. In the burning test, 2 of the 10 injection-molded pieces extinguished themselves immediately and 8 within 3 seconds.

Example 2

One hundred parts by weight of high density polyethylene, 10 parts by weight of oxalic acid-bis(pentachlorophenyl) ester, 5 parts by weight of antimony trioxide, and 1 part by weight of 4,4'-isopropylidene bisphenol were processed as described in Example 1 into injection-molded rods. Of 10 injection-molded pieces, 6 extinguished themselves within 2 seconds, 4 after 4 seconds.

Example 3

One hundred parts by weight of high density polyethylene, 30 parts by weight of oxalic acid-bis(trichlorophenyl) ester, 20 parts by weight of antimony trioxide, and 0.5 part by weight of 4,4'-isopropylidene bisphenol were processed as described in Example 1 into injection-molded rods. Of 10 injection-molded pieces, 5 extinguished themselves within 4 seconds, 5 within 9 seconds.

Example 4

One hundred parts by weight of isotactic polypropylene, 12 parts by weight of tetrachlorosuccinic acid-bis(pentachlorophenyl) ester, 6 parts by weight of antimony trioxide, and 1.2 parts by weight of 4,4'-isopropylidene bisphenol were processed as described in Example 1 into injection-molded rods. Of 10 injection-molded pieces, 10 extinguished themselves within 2 seconds.

The following properties were measured on the composition of Example 4 in comparison with the isotactic polypropylene used as starting material:

| Properties | Test Method | Unit of Measurement | Polypropylene | Composition of Ex. 4 |
|---|---|---|---|---|
| Density (at 20° C.) | Buoyancy | G./cm.$^3$ | 0.905 | 0.990 |
| Melt index i$_5$ at 250° C | Modified ASTM D 1238-57T (Condition G, but at 250° C.). | G./10 min.$^3$ | 19.8 | 80 |
| Ball indentation hardness (after 10' and after 60" at 20° C.). | VDE 0302 §6 | Kg./cm.$^2$ | 765/710 | 644/585 |
| Tensile strength (at 20° C.) | Rate of applied stress 100 mm./min | Kg./cm.$^2$ | 320 | 306 |
| Modulus in torsion (at 120° C.) | ASTM-D 1043-51 | Kg./cm.$^2$ | 450 | 330 |

Example 5

One hundred parts by weight of high density polyethylene, 11 parts by weight of succinic acid-bis(pentachlorophenyl) ester, 6 parts by weight of antimony trisulfide, and 0.5 part by weight of 4,4'-isopropylidene bisphenol were processed as described in Example 1 into injection-molded pieces. Of 10 test rods, 8 extinguished themselves immediately and 2 within 2 seconds.

Example 6

One hundred parts by weight of isotactic polypropylene, 20 parts by weight of adipic acid-bis(pentachlorophenyl) ester, 10 parts by weight of antimony pentoxide, and 1 part by weight of 4,4'-isopropylidene bisphenol were processed as described in Example 1 into injection-molded pieces. Of 10 test rods, 10 extinguished themselves within 2 seconds.

Example 7

One hundred parts by weight of isotactic polypropylene, 30 parts by weight of adipic acid-bis(pentachlorophenyl) ester, 30 parts by weight of antimony trioxide, and 1 part by weight of 4,4'-isopropylidene bisphenol were processed as described in Example 1 into injection-molded rods. Of 10 test rods, 3 extinguished themselves within 3 seconds and 7 within 15 seconds.

Example 8

One hundred parts by weight of high density polyethylene, 20 parts by weight of sebacic acid-bis(pentachlorophenyl) ester, 15 parts by weight of antimony trioxide, and 1 part by weight of 4,4'-isopropylidene bisphenol were processed as described in Example 1 into injection-molded rods. Of 10 test rods, 4 extinguished themselves within 1 second and 6 within 3 seconds.

Example 9

One hundred parts by weight of low density polyethylene, 20 parts by weight of sebacic acid-bis(2,4-dichlorophenyl) ester, 10 parts by weight of antimony trioxide, and 0.5 part by weight of 4,4'-isopropylidene bisphenol were processed as described in Example 1 into injection-molded rods. Of 10 test rods, 10 extinguished themselves within 10 seconds.

Example 10

One hundred parts by weight of high density polyethylene, 15 parts by weight of fumaric acid-bis(pentachlorophenyl) ester, 7.5 parts by weight of antimony trioxide, and 0.5 part by weight of 4,4'-isopropylidene bisphenol were processed as described in Example 1 into injection-molded rods. All 10 test rods extinguished themselves immediately.

Example 11

One hundred parts by weight of polystyrene, 30 parts by weight of adipic acid-bis(pentachlorophenyl) ester, 15 parts by weight of antimony trioxide, and 1 part by weight of 4,4'-isopropylidene bisphenol were processed as described in Example 1 into injection-molded rods. All 10 test rods extinguished themselves immediately.

Example 12

One hundred parts of ethylene-butene-1 copolymer containing 7 mole percent of butene-1 and a reduced viscosity of 2.2 dl./g., 15 parts by weight of tetrachlorosuccinic acid-pentachlorophenyl ester, and 7 parts by weight of antimony trioxide were processed as described in Example 1 into injection-molded rods. Of 10 injection-molded pieces, 10 extinguished themselves within 4 seconds.

Example 13

One hundred parts by weight of low density polyethylene, 10 parts by weight of oxalic acid-bis(pentabromophenyl) ester, and 5 parts by weight of arsenic trioxide were processed as in Example 1. Of 10 injection-molded rods, 4 extinguished themselves immediately and 6 within 3 seconds.

Example 14

One hundred parts by weight of high density polyethylene, 5 parts by weight of oxalic acid-bis(pentabromophenyl) ester, 3 parts by weight of antimony trioxide, and 1 part by weight of 4,4'-isopropylidene bisphenol as stabilizer were converted into rods as described in Example 1. Of 10 injection-molded pieces, 7 extinguished themselves within 3 seconds and 3 within 5 seconds.

Example 15

One hundred parts by weight of high density polyethylene, 20 parts by weight of oxalic acid-bis(tribromophenyl) ester, 10 parts by weight of antimony trioxide, and 0.5 part by weight of 4,4'-isopropylidene bisphenol were processed as described in Example 1. Of 10 injection-molded pieces, 2 extinguished themselves within 2 seconds, 8 within 5 seconds.

Example 16

One hundred parts by weight of high density polyethylene, 7 parts by weight of succinic acid-bis(pentabromophenyl) ester, 4 parts by weight of antimony pentoxide, and 1 part by weight of 4,4'-isopropylidene bisphenol were processed as described in Example 1. Of 10 test rods, 10 extinguished themselves immediately.

Example 17

One hundred parts by weight of isotactic polypropylene, 5 parts by weight of adipic acid-bis(pentabromophenyl) ester, 2.5 parts by weight of antimony trioxide, and 1 part by weight of pentaerythritol were processed as described in Example 1. Of 10 test rods, 3 extinguished themselves immediately, 7 within 3 seconds.

Example 18

One hundred parts by weight of isotactic polypropylene, 7 parts by weight of adipic acid-bis(pentabromophenyl) ester, 3 parts by weight of antimony trioxide, and 0.25 part by weight of pentaerythritol were processed as described in Example 1. Of 10 test rods, 10 extinguished themselves immediately.

In order to determine the influence of the additions on the mechanical properties of polypropylene, some of the physical properties of the composition of this example were compared with those of the polypropylene without additives. The values obtained are summarized in the following table:

| Properties | Test Method | Unit of Measurement | Polypropylene | Composition of Ex. 18 |
|---|---|---|---|---|
| Melt index $i_5$ at 220° C | Modified ASTM D 1238-57 T (Condition G but at 220° C.). | G./10' | 2.8 | 6.3 |
| Ball indentation hardness (after 10' and after 60" at 20° C.). | VDE 0302 § 6 | Kg./cm.$^2$ | 737/677 | 708/652 |
| Flexual stress at a deflection of 4 mm. at 20° C. | DIN 53452 | Kg./cm.$^2$ | 495 | 444 |
| Modulus in torsion (at 120° C.) | ASTM D 1043-51 | Kg./cm.$^2$ | 393 | 373 |
| Inpact strength, 20° C | DIN 53453 | Cm. kg./cm.$^2$ | (¹) | (¹) |
| Impact strength (notched), 20° C | DIN 53453 | Cm. kg./cm.$^2$ | 4.6 | 4.5 |
| Vicat value | VDE 0302 § 76 | ° C | 83 | 85 |

¹ Without break.

The table shows that the flow of the mixture is greatly improved and the flexural stress at a certain deflection somewhat reduced. The other values remain practically unchanged.

Example 19

One hundred parts by weight of isotactic polypropylene, 15 parts by weight of adipic acid-bis(tribromophenyl) ester, 7 parts by weight of antimony trioxide, and 0.5 part by weight of 4,4'-isopropylidene bisphenol were processed as described in Example 1. Of 10 test rods, 10 extinguished themselves immediately.

Example 20

One hundred parts by weight of isotactic polypropylene, 30 parts by weight of adipic acid-bis(pentabromophenyl) ester, 15 parts by weight of antimony trioxide, and 1 part by weight of 4,4'-isopropylidene bisphenol were processed as described in Example 1. Of 10 test rods, 3 extinguished themselves immediately, 7 within 3 seconds.

Example 21

One hundred parts by weight of isotactic polypropylene, 30 parts by weight of adipic acid-bis(pentabromophenyl) ester, 30 parts by weight of antimony trioxide, and 1.5 parts by weight of 4,4'-isopropylidene bisphnol were processed as described in Example 1. Of 10 test rods, 5 extinguished themselves within 3 seconds and 5 within 10 seconds.

It was surprising to observe that the higher antimony trioxide content causes in these tests a longer burning time than for the samples of Example 20.

Example 22

One hundred parts by weight of high density polyethylene, 15 parts by weight of sebacic acid-bis(tribromodichlorophenyl) ester, 7.5 parts by weight of antimony trioxide, and 1 part by weight of 4,4'-isopropylidene bisphenol were processed as described in Example 1. Of 10 test rods, 4 extinguished themselves within 1 second and 6 within 6 seconds.

Example 23

One hundred parts by weight of low density polyethylene, 30 parts by weight of sebacic acid-bis(2,4-dibromophenyl) ester, 3 parts by weight of antimony trioxide, and 0.5 part by weight of 4,4'-isopropylidene bisphenol were processed as described in Example 1. Of 10 test rods, 10 extinguished themselves within 7 seconds.

Example 24

One hundred parts by weight of high density polyethylene, 8 parts by weight of fumaric acid-bis(pentabromophenyl) ester, 3 parts by weight of antimony trioxide, and 0.5 part by weight of pentaerythritol were processed as described in Example 1. Of 10 test rods, 10 extinguished themselves immediately.

Example 25

One hundred parts by weight of polystyrene, 20 parts by weight of adipic acid-bis(pentabromophenyl) ester, 10 parts by weight of antimony trioxide, and 1 part by weight of 4,4'-isopropylidene bisphenol were processed as described in Example 1. Of 10 test rods, 8 extinguished themselves immediately and 2 within 1 second.

Example 26

One hundred parts by weight of ethylene-butene-1 copolymer containing 7 mole percent of butene-1 having a reduced viscosity of 2.2 dl./g., 7 parts by weight of antimony trioxide, and 1 part by weight of pentaerythritol were processed as described in Example 1. All 10 test rods extinguished themselves immediately.

What we claim and desire to protect by Letters Patent is:

1. A polyolefin composition of reduced flammability comprising (1) a polymer of a mono-alpha-olefin, (2) a compound selected from the group consisting of oxygen and sulfur compounds of arsenic, antimony, and bismuth, and (3) an aromatic ester of a dicarboxylic acid having a formula selected from the group consisting of (a) 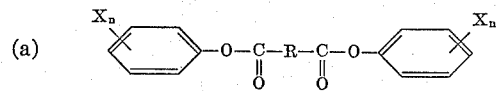

and (b) 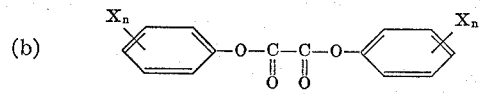

wherein R in Formula $a$ is a radical selected from the group consisting of hydrocarbon, chlorohydrocarbon, and oxyhydrocarbon radicals having from 1 to 10 carbon atoms, X in both Formulae *a* and *b* represents a halogen selected from the group consisting of chlorine and bromine, and *n* in both Formulae *a* and *b* is an integer from 2 to 5, compound (2) being present in the amount of 2 to 30 parts by weight per 100 parts of polyolefin and compound (3) being present in the amount of 3 to 30 parts by weight per 100 parts of polyolefin.

2. The composition of claim 1 in which the polyolefin is polypropylene.

3. The composition of claim 1 in which the polyolefin is polyethylene.

4. The composition of claim 1 in which compound (1) is antimony trioxide.

5. The composition of claim 1 in which compound (3) is tetrachlorosuccinic acid-bis(pentachlorophenyl) ester.

6. The composition of claim 1 in which compound (3) is oxalic acid-bis(pentachlorophenyl) ester.

7. The composition of claim 1 in which compound (3) is adipic acid-bis(pentachlorophenyl) ester.

8. The composition of claim 1 in which compound (3) is succinic acid-bis(pentabromophenyl) ester.

References Cited by the Examiner
UNITED STATES PATENTS

| | | | |
|---|---|---|---|
| 2,724,643 | 11/1955 | Morris et al. | 260—475 |
| 2,822,378 | 2/1958 | Bader | 260—475 |
| 3,075,944 | 1/1963 | Wick et al. | 260—45.75 |

LEON J. BERCOVITZ, *Primary Examiner.*

G. W. RAUCHFUSS, JR., *Assistant Examiner.*